United States Patent
Aoki (10) Patent No.: US 7,266,022 B2
(45) Date of Patent: Sep. 4, 2007

(54) MEMORY INTERFACE CONTROL CIRCUIT

(75) Inventor: Mutsumi Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/384,406

(22) Filed: Mar. 20, 2006

(65) Prior Publication Data

US 2006/0221088 A1 Oct. 5, 2006

(30) Foreign Application Priority Data

Mar. 18, 2005 (JP) ............................. 2005-078407

(51) Int. Cl.
*G11C 7/00* (2006.01)
(52) U.S. Cl. ................. 365/189.05; 365/193; 365/194; 365/233
(58) Field of Classification Search ............ 365/189.05
See application file for complete search history.

(56) References Cited

U.S. PATENT DOCUMENTS 6,407,963 B1 * 6/2002 Sonoda et al. ........... 365/233.5

6,621,760 B1 * 9/2003 Ahmad et al. ............... 365/233
7,031,205 B2 * 4/2006 Han et al. .................... 365/193
7,038,953 B2 * 5/2006 Aoki ...................... 365/189.05

FOREIGN PATENT DOCUMENTS

JP 2001-189078 7/2001
JP 2004-092268 3/2004

* cited by examiner

*Primary Examiner*—Son L. Mai
(74) *Attorney, Agent, or Firm*—Scully, Scott, Murphy & Presser, P.C.

(57) ABSTRACT

The memory interface control circuit includes a mask-release-signal generation circuit which generates a basic mask-release signal from a data strobe signal input from a DRAM and a read timing signal indicative of a read start, a mask-release-signal generation circuit which generates a mask signal from a basic mask-release signal and a read mode signal indicative of a read mode of the DRAM, and a strobe signal generation circuit which generates an internal data strobe signal from a delayed data strobe signal and the mask signal. The mask of the data strobe signal alleviates gridge noise in the memory interface control circuit

4 Claims, 7 Drawing Sheets

MEMORY INTERFACE CONTROL CIRCUIT

BACKGROUND OF THE INVENTION

1. Field of the Invention

The present invention relates to a memory interface control circuit and, more specifically, to a memory interface control circuit suitable for use in a memory controller which reads data from a double-data-rate SDRAM such as a DDR2-SDRAM (Double Data Rate 2-Synchronous Random Access Memory).

2. Description of the Related Art

Figure 6:
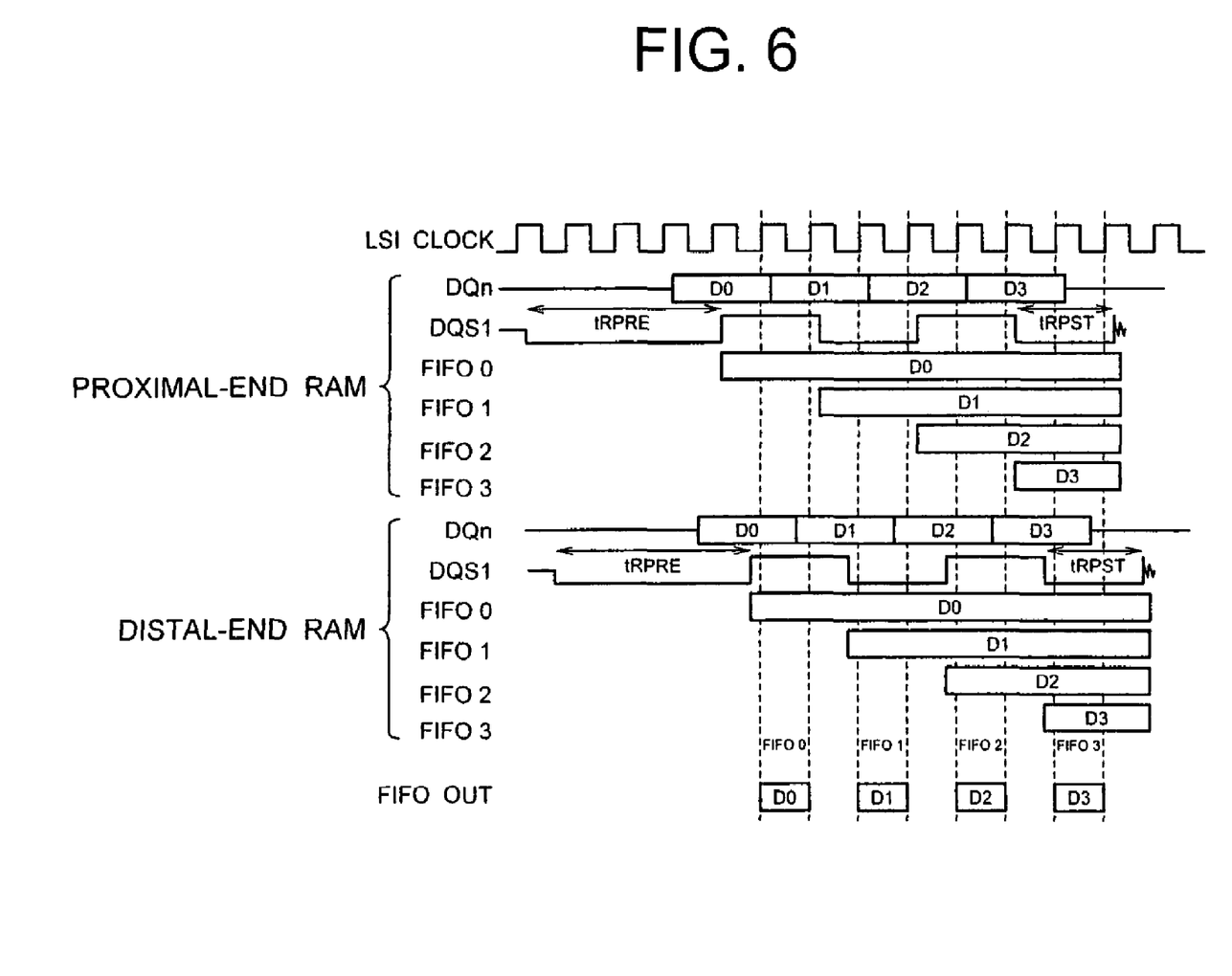
FIG. 6 is a signal timing chart of a conventional memory interface control circuit.

Double-data-rate SDRAMs, such as DDR-SDRAM and DDR2-SDRAM, which read/write data at a timing of both rising and falling edges of a clock pulse have become the mainstream of DRAMs. In DDR-SDRAM and DDR2-SDRAM, a data strobe signal DQS is switched to a high impedance state upon elapse of a low-fix time ($t_{RPST}$: Read-Postamble Period) which occurs at the time insant when RAM read is finished. As has been known, at the time of switching to this high impedance state, gridge noise is generated in the data strobe signal. Since the DDR-SDRAM uses a relatively low transfer frequency, timing to pick up data from a first-in first-out (FIFO) circuit which temporarily latches read data still exists even if gridge noise is generated on the data strobe signal. In the DDR2-SDRAM, however, the transfer frequency is about twice as high as that of the DDR-SDRAM. Therefore, gridge noise mixed in the data strobe signal may result in damage of data stored in the FIFO circuit in some cases. This leads to the problem of difficulties in setting the timing of synchronizing the read data stored in the FIFO circuit. FIG. 6 depicts this situation in the form of a timing chart. In FIG. 6, the gridge noise generated in the data strobe signal DQS1 at the end of the low-fix period destroys the data in the FIFO circuits, as shown at the timing specified by a dotted mark. This timing chart shows that, with respect to the data read from RAMs at both the proximal end and distal end as viewed form a memory controller, the data in the FIFO circuits are destroyed due to the gridge noise which is generated after elapse of the low-fix period $t_{RPST}$.

In order that the FIFO circuit provide timing of synchroniizing the data, the destruction of data has to be prevented by masking the data strobe signal DQS1 when the data strobe signal DQS1 shifts to a high impedance state. In conventional techniques, the timing of generating a mask-release signal to release the mask applied to the data strobe signal DQS1 is determined by desk calculations. However, in a semiconductor device having a plurality of DDR2-SDRAMs, the time length required for reading data varies depending on differences in the distance from the memory controller, resulting in destruction of some data if the mask-release signal is generated at a specific timing. That is, the timing to generate the release signal is difficult to determine. For example, JP-2001-189078A describes the technique for determining the timing of masking the data strobe signal.

The assigner of the present application proposed, in an earlier application, JP-2004-092268, a memory interface control circuit which generates a secondary data strobe signal by removing gridge noise from a delayed data strobe signal generated by delaying the data strobe signal.

Figure 7:
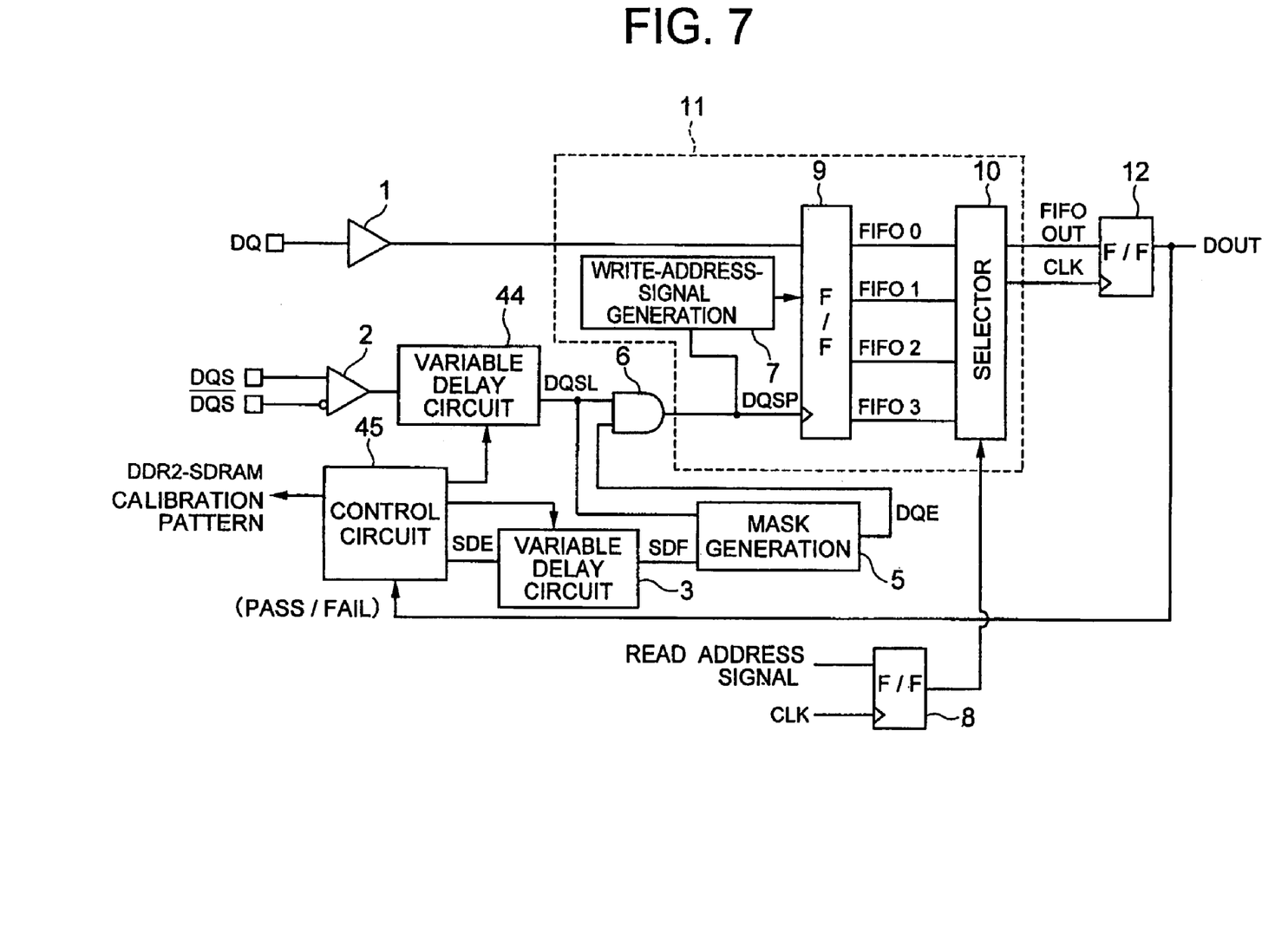
FIG. 7 is a block diagram of the memory interface control circuit disclosed in an earlier application.

FIG. 7 shows the configuration of the memory interface control circuit described in the earlier application. In the memory interface control circuit, a control circuit 45 has a function of generating a basic mask signal SDE before a delay adjustment, and a function of controlling the delay time of variable delay circuits 3 and 44, thereby allowing a calibration mask signal to be generated at a variable timing. Upon initialiing DDR2-SDRAMs, the control circuit 45 allows the calibration mask signal to be generated by changing the delay time of the variable delay circuit 3. Based on the thus generated data strobe signal which defines the mask timing and the mask release timing, the control circuit 45 allows the data to be read from the DDR2-SDRAMs, whereby the read data is output from a F/F gate 12. A PASS/FAIL determination to specify whether or not the acquired read data is acceptable is carried out to determine an optimum mask timing. For the subsequent read operation, the data strobe signal having the thus determined mask timing is used.

In the configuration of the earlier application, the PASS/FAIL determination is made for the calibration signal based on the actual read data. Therefore, a superior data strobe signal having an optimum mask timing can be obtained. However, the configuration of the control circuit 45 is complicated, and the calibration needs to be carried out at any time during the initialization, resulting in a complex processing.

SUMMARY OF THE INVENTION

It is an object of the present invention to improve the memory interface control circuit disclosed in the earlier application as described above and to provide a new memory interface control circuit suitably for use in a memory controller, which is capable of improving the gridge noise tolerance of read data during transferring the read data between a memory device (particularly a DDR-SDRAM or DDR2-SDRAM) and a memory controller LSI and capable of alleviating the limitations on the physical positional relationship between the memory device and the memory controller LSI.

The present invention provides a memory interface control circuit for use in a memory controller for reading data from a double-data-rate synchronous DRAM (SDRM), including: a basic-mask-release-signal generation circuit for generating a basic mask-release signal based on a data strobe signal generated in the SDRAM and a read mode signal indicating a read mode of the SDRAM; a delay circuit for delaying the data strobe signal to generate a delayed data strobe signal; an internal data-strobe-signal generation circuit for generating an internal data strobe signal based on the delayed data strobe signal and the basic mask-release signal; and a latch circuit for latching read data based on the internal data strobe signal.

According to the memory interface control circuit of the present invention, the internal data strobe signal is generated on the basis of timing of the data strobe signal fed from the memory device. The internal data strobe signal is transferred to the FIFO circuit. Therefore, masking of the data strobe signal is released at an optimum timing to thereby enable the receipt of data without being affected by gridge noise. As a result, there is no need for initialization processing including the PASS/FAIL determination of data latch. The timing at which the data strobe signal reaches the memory interface control circuit is matched well with the timing at which read data reaches the memory interface control circuit Therefore, the timing for latching the read data can be determined independently from the positional relationship between the memory controller LSI and the memory device.

In a preferred embodiment of the memory interface control circuit according to the present invention, the delay circuit is a variable delay circuit which is capable of setting the variable delay time. By using the variable delay circuit, the mask timing of the internal data strobe signal can be determined at an optimum timing.

In another preferred embodiment of the present invention, the internal data-strobe-signal generation section includes a mask-release-signal generation circuit which generates a mask-release signal from the basic mask-release signal and a read mode signal indicative of a read mode of the SDRAM, and an AND gate which calculates a logical product of the delayed data strobe signal and the mask-release signal. In this case, the internal data strobe signal can be generated by a circuit of a simple configuration.

The latch circuit is generally configured as a first-in first-out (FIFO) circuit for a SDRAM of a double-data-rate configuration.

DETAILED DESCRIPTION OF THE PREFERRED EMBODIMENT(S)

Figure 1:
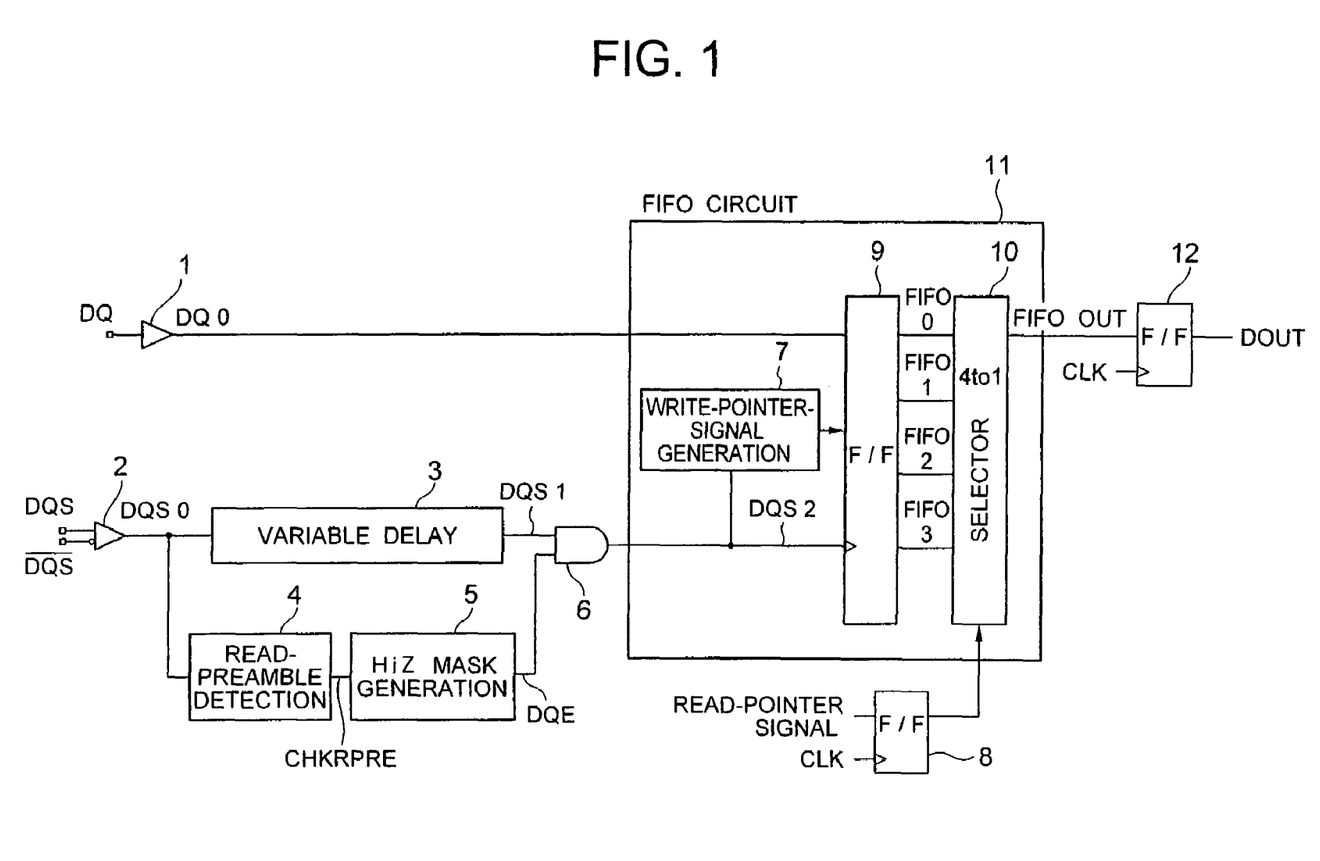
FIG. 1 is a block diagram of a memory interface control circuit according to an embodiment of the present invention.

An embodiment of the present invention will now be specifically described below with reference to the drawings. To facilitate understanding of the present invention, similar reference symbols are used throughout the whole drawings. FIG. 1 is a block diagram of a memory interface control circuit according to the embodiment of the present invention. In FIG. 1, an I/O (input/output) buffer 1 is shown as an input buffer which receives data DQ read from a DDR2-SDRAM. Another I/O buffer 2 is also shown as an input buffer which receives data strobe signals DQS and /DQS (where /DQS means an inverted DQS signal) read from the DDR2-SDRAM as well. It is to be noted that data strobe signals are balanced inputs/outputs in the DDR2-SDRAMs. Although the I/O buffers 1 and 2 each are essentially a bi-directional buffer, these buffers are expressed as input buffers for a better understanding of the present invention, because the present invention is directed to an improvement of transfer of the read data from SDRAMs.

The data strobe signal DQS is output from the DDR2-SDRAM in synchrony with the data signal DQ. If the data strobe signal DQS output from the memory device is used directly as a data strobe signal, a time width or time window for receiving the read data cannot be secured in the memory controller, which means an absence of the timing to receive the read data. Therefore, control of shifting the phase of the data strobe signal by half of one period of the clock signal is performed by a variable delay circuit 3. Upon completion of data transfer, the data strobe signal DQS shifts to a high impedance (Hi-Z) state after a low-fix time ($t_{RPST}$: read-Postamble Period) is elapsed since the completion of the data transfer. Upon shifting of the data strobe signal DQS to the Hi-Z state, the gridge noise may possibly occur. Hence, the Hi-Z state of the data strobe signal DQS should be masked. In the DDR2-SDRAM, the low-fix output signal is provided for a predetermined time length ($t_{RPRE}$: Read-Preamble Period) also upon staring of a RAM read. A read-preamble detection circuit 4 detects the low-fix output signal, and determines that the read timing occurs for the SDRAM. Then, the read-preamble detection circuit 4 outputs a CHKRPRE signal indicative of start of a read mode.

A Hi-Z mask generation circuit 5 receives the CHKRPRE signal from the read-preamble detection circuit 4 which has detected that the DDR2-SDRAM has shifted into a read mode. The Hi-Z mask generation circuit 5 then generates a mask-release signal DQE which releases the mask only during the read mode. A logical product of the mask-release signal DQE generated by the Hi-Z mask generation circuit 5 and a data strobe signal DQS1 having a phase which has been delayed by half of the period of the clock signal by the variable delay circuit 3 is calculated by an AND gate 6, to thereby generate an internal data strobe signal DQS2 from which the gridge noise has been removed. A write-pointer-signal generation circuit 7 generates a write-pointer signal, which controls the order of writing into a F/F gate group 9, from the internal data strobe signal DQS2.

The write-pointer-signal generation circuit 7, the F/F gate group 9, and a selector 10 function as a FIFO circuit (first-In first-out) circuit 11. A F/F gate 8 receives a read-pointer signal and feed this signal as a selection signal to a selector 10. Another F/F gate 12 receives a FIFO-output signal as an output of the FIFO circuit 11. The read-pointer signal which the F/F gate 8 receives is a logical signal used by the LSI device which mounts thereon the present memory interface control circuit.

In the above embodiment, the internal data strobe signal DQS2 performs masking at any time unless this signal is necessary. Therefore, the gridge noise tolerance of read data is improved. In addition, read timing of DDR2-SDRAM is directly detected from the data strobe signals DQS and /DQS output from the DDR2-SDRAM, and the data strobe signals are fed at the same timing as the read data. Therefore, the memory interface control circuit has such an optimum gridge noise mask function which absorbs differences in the delay caused by the difference in the distance between the DDR2-SDRAMs and the memory controller LSI due to the positional relationships therebetween.

Figure 2:
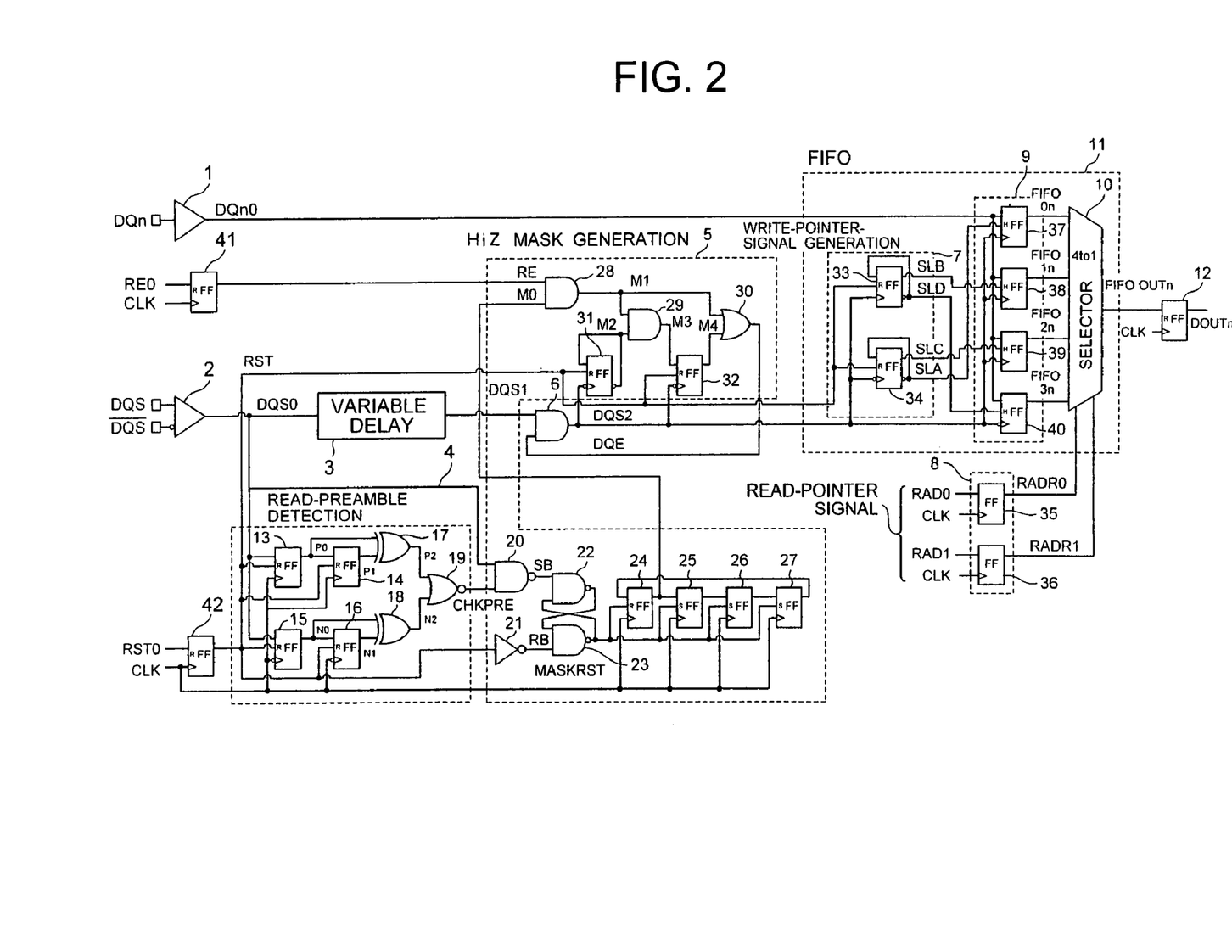
FIG. 2 is a circuit diagram showing details of the memory interface control circuit shown in FIG. 1.

FIG. 2 shows a specific circuit configuration of the memory interface control circuit according to the present embodiment as described above. In this figure, the I/O buffer 1 is an input buffer which receives data DQn read from the DDR2-SDRAM. The I/O buffer 2 is also an input buffer which receives data strobe signals DQs and /DQS read from the DDR2-SDRAM. In the DDR2-SDRAMs, data strobe signals each are balanced inputs/outputs. The variable delay circuit 3 performs control of shifting, by half period, the phase of the data strobe signal DQS output from the DDR2-SDRAM, to thereby generate the delayed data strobe signal DQS1.

When read of a DDR2-SDRAM is to be performed, the delayed data strobe signal DQS1 performs toggle operation such as, HiZ-L-L-H-L- . . . -H-L-HiZ, as shown in FIG. 6. The period of L-L in the delayed data strobe signal is the read-preamble time. The read-preamble detection circuit 4 detects this period of L-L from the data strobe signal DQS, and outputs a CHKRPRE signal indicative of detecting that the DDR2-SDRAM has been in a read mode. The Hi-Z mask generation circuit 5 generates a mask-release signal DQE, which releases the Hi-Z mask only in the read mode, from the CHKRPRE signal. The AND gate 6 calculates a logical product of the mask-release signal DQE generated by the Hi-Z mask generation circuit 5 and the delayed data strobe signal DQS1 having a phase which has been delayed by half the period by the variable delay circuit 3, to thereby generate, from the delayed data strobe signal DQS1, an internal data strobe signal DQS2, from which the gridge noise has been removed.

The write-pointer-signal generation circuit 7 generates, from the internal data strobe signal DQS2, a write-pointer signal to control the order in which the write operation is performed into the F/F gate group 9 configured by F/F gates 37 to 40. In the present embodiment, the write-pointer-signal generation circuit 7, F/F gate group 9, and a 4-inputs/1-output (4-to-1) selector 10 function as a FIFO (First-In First-Out) circuit 11 having four stages. Since the FIFO circuit has four stages of data input, the read-pointer signal which controls the 4-to-1 selector 10 has 2 bits. This 2-bit signal is referred to as read address signals RAD0 and RAD1 in this text. The F/F gate group 9 receives the read address signal RAD0 and RAD1. Another F/F gate 12 receives a FIFO-output signal as an output of another F/F gate 11. It is to be noted that the read-pointer signal is a logical signal of the memory controller LSI which mounts thereon the present memory interface control circuit Another F/F gate 41 receives a RE0 signal indicative of whether or not the current read mode is a continuous read mode. Another F/F gate 42 receives a RST0 signal as a reset signal of the present interface circuit. An output RE of the F/F gate 41 is input to an AND gate 28 of the Hi-Z mask generation circuit. An output of the F/F gate 42 is input to the read-preamble detection circuit 4.

Although a specific configuration has thus been described in details above, the configurations of the variable delay circuit 3 and 4-to-1 selector circuit 10 are well known to the persons in the art, and do not directly relate to the present invention. Therefore, detailed description of the configurations of these circuits will be omitted herein.

Figure 3:
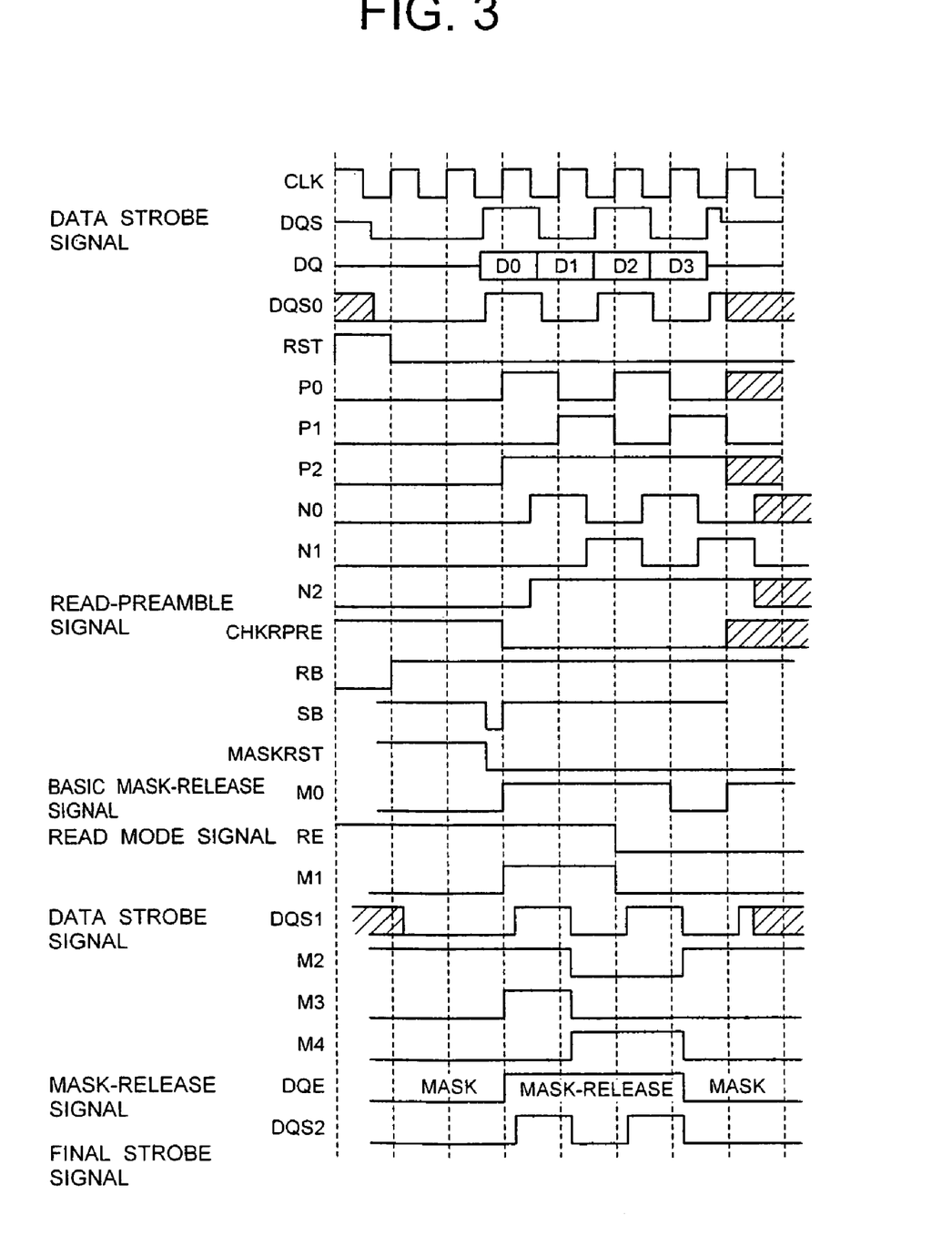
FIG. 3 is a signal timing chart of the memory interface control circuit shown in FIG. 2.

Referring to a timing chart shown in FIG. 3, the operation of the read-preamble detection circuit 4 and the Hi-Z mask generation circuit 5 as shown in FIG. 2 will now be described in more details. In FIG. 3, the edge of the data strobe signals DQS, DQS0 and DQS1 encircled by a dotted line shows occurrence of gridge noise.

In advance, the F/F gates 13 to 16 and F/F gates 31 to 34 are reset by a RST signal. A RS-F/F gate configured by NAND gates 20, 22, and 23 and an inverter 21 is reset as well. Likewise, the F/F gate 24 is also reset whereas the F/F gates 25, 26, and 27 are set. During the read-preamble period, a rising or falling edge occurs twice in the clock signal CLK of the LSI, which mounts thereon the present memory interface control circuit. Start of the RAM read is determined by detecting one of these edges. More specifically, the F/F gates 13 and 14 and an Ex-OR circuit 17 detect the rising edge while the F/F gates 15 and 16 and another Ex-OR circuit 18 detect the falling edge. From results thereof, a NOR logic is obtained to generate a read preamble signal, i.e., CHKRPRE signal, indicative of detecting that the RAM has shifted into a read mode. The shift of the CHKRPRE signal to a low level means a start of the RAM read operation.

The DDR2-SDRAM is of a sword pre-fetch type and has a minimum burst length of 4. Therefore, the period for which masking of the edge of the data strobe signal is released is equivalent to at least three periods of the clock signal. At this timing, a basic mask-release signal M0 which is continuously kept at a H-level for three periods of the clock signal CLK is generated by the F/F gates 24 to 27. Although this is enough to cover a single read operation for a burst transfer of four data, the memory interface circuit should cover a burst transfer of eight data during the continuous data read. Since whether or not the read operation is a continuous read operation is determined upon creating a read command, a logical product of a RE signal which determines whether or not the current mode is a read mode and the basic mask-release signal M0 is obtained to generate a signal M1. The RE signal is set at a L-level upon an end of the read mode. The change of timing of the RE signal differs from the mask timing of the strobe signal, i.e., RE can be changed to a H-level at any time after generation of a RAM-read command signal so long as the mask-release signal M0 assumes a L-level. Further, the change of the RE signal to a L-level may be conducted at any time in a period in which the basic mask-release signal M0 assumes a H-level.

Since the above operation does not require a strict change timing, the timing may be coarsely estimated in advance by using desk calculations. A signal M2 which has a reversed phase of a signal obtained by dividing the internal data strobe signal DQS2 in the F/F gate 31 at reversed edges is ANDed in an AND gate 29 with a signal M1 generated as a logical product of signals M0 and RE, to generate a signal M3. A signal M4 latched by the F/F gate 32 which latches the signal M3 is ORed with the signal M1 in an OR gate 30, to thereby generate a final mask-release signal DQE. The mask-release signal DQE has a function of masking at a L-level thereof and releasing a mask at a H-level thereof.

A logical product of the mask-release signal DQE and the data strobe signal DQS1 is obtained by the AND gate 6, whereby a final internal data strobe signal DQS2 having no gridge noise is generated. The delay time adjusted by the variable delay circuit 3 is set at an optimum value, considering a delay from the I/O buffer input of the data signal DQn to data input to the F/F gate group 9, a delay from the I/O buffer input of DQS to the variable delay circuit 3, and a delay up to a clock input of the delayed data strobe signal DQS1 to the F/F gate group 9.

Figure 4:
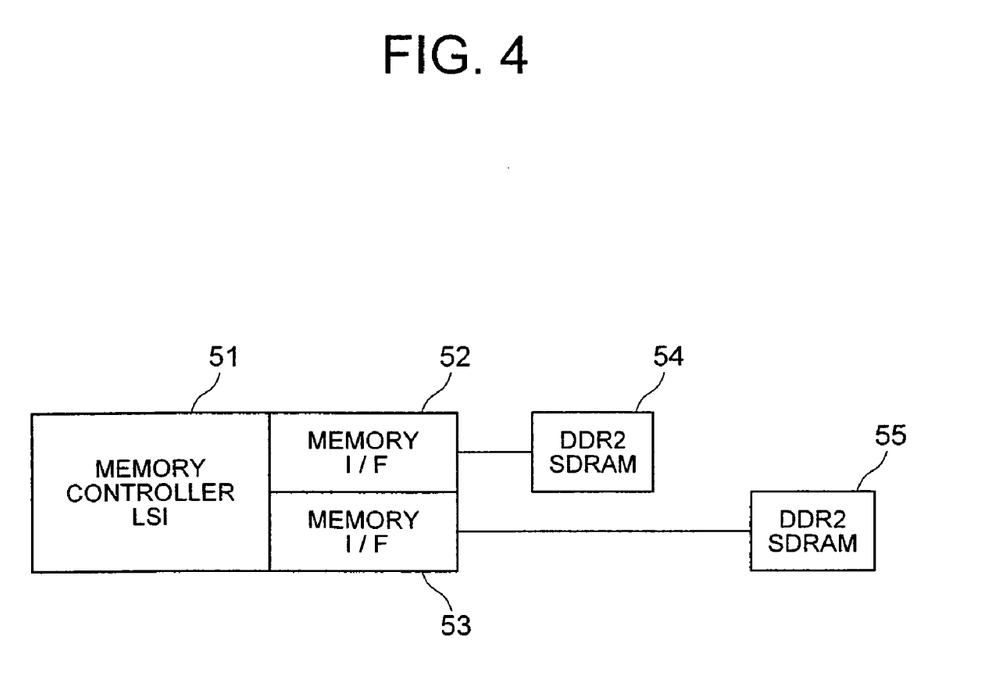
FIG. 4 is a schematic diagram showing a positional relationship between the memory controller LSI and the DDR2-SDRAMs.
Figure 5:
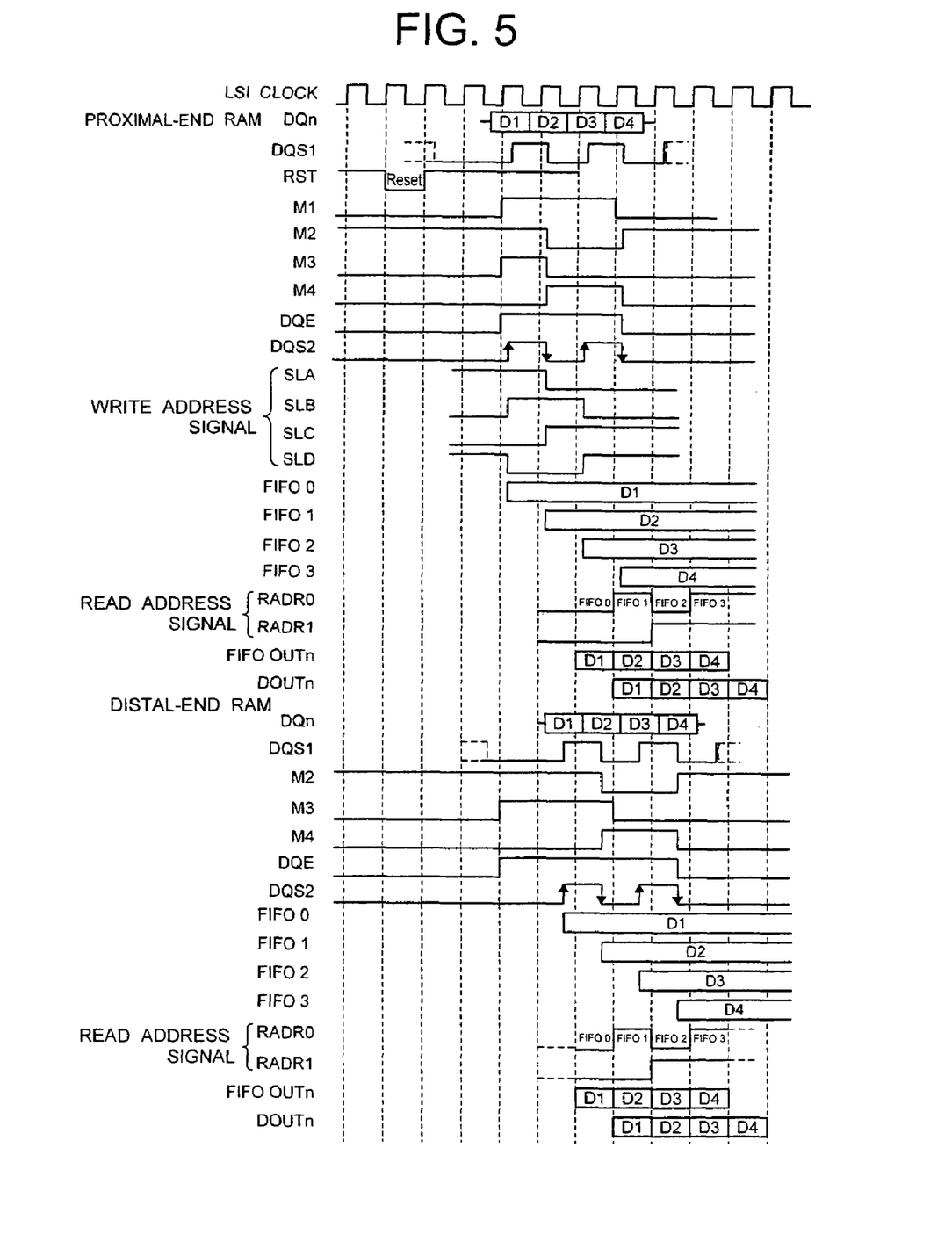
FIG. 5 is a signal timing chart of the memory interface control circuit shown in FIG. 2 in the case of the positional relationship shown in FIG. 4.

In general, a plurality of DDR2-SDRAMs are mounted on a LSI. Therefore, as shown in FIG. 4, there exist a proximal-end DDR2-SDRAM 54 located closest to the LSI 51 on which the present memory interface control circuits 52 and 53 are mounted, and a distal-end DDR2-SDRAM 55 located farthest therefrom. FIG. 5 is a timing chart showing operation of the present memory interface control circuits 52 and 53 for each of the proximal-end RAM 54 and distal-end RAM 55 shown in FIG. 4. The description up to the internal data strobe signal DQS2 including therein no gridge noise is same as the description presented heretofore and will therefore be omitted.

The internal data strobe signal DQS2 is divided, whereby write address signals SLA, SLB, SLC and SLD are generated. These signals are distributed to hold signals of the F/F gate group 9 including F/F gate 37, F/F gate 38, F/F gate 39 and F/F gate 40 and having a holding function. When the hold signal is "1", this signal functions as a "through" signal. When the hold signal is "0", this signal functions as a "hold" signal. Therefore, data of D0, D1, D3, and D4 are respectively stored into the F/F gates 37, 38, 39 and 40. By reading these data in due order by read address signals RADR0 and RADR1, the FIFO output signals are D1, D2, D3 and D4 in the order such that shown in FIG. 5.

The time length from the time instant at which the read command is issued to the time instant at which the read data output from both the DDR2-SDRAMs 54 and 55 reach the memory controller LSI 51 differs, as shown in FIG. 5, between the case of the RAM 54 located at the proximal end with respect to the LSI 51 and the other case of the RAM 55 located at the distal end. However, according to the configuration of the present embodiment, the timing relationship between the data strobe signal DQS and the read data DQ is equivalent between the proximal-end RAM 54 and the distal-end RAM 55. Therefore, the data can be received without a problem.

In FIG. 3, the number of data signals DQ is arbitrarily given in compliance with the bit width of the RAM to be connected, which is equal to n. The bit width, n, is normally "4", "8" or "16", and is generally "8" in particular. Although a variable delay circuit is used for phase adjustment of the strobe signal DQS, a fixed delay circuit can be used without a problem so far as the FIFO circuit of the LSI in the receiving side can perform accurate sampling. To the contrary, a strict delay adjustment may be carried out by taking advantage of a DLL (Delay Locked Loop) circuit or the like.

Although the FIFO circuit is configured by the write-pointer-signal generation circuit 7, F/F gate group 9 and 4-to-1 selector 10 such as shown in FIG. 2 in the present embodiment, a different circuit configuration having a similar function such as a counter or the like may be used. The read-preamble detection circuit 4 and the Hi-Z mask generation circuit 5 each are not limited to the circuit configuration described in FIG. 2, and may be configured by another circuit configuration having similar functions. In FIG. 2, the F/F gate 12 which receives the FIFO output signal is provided. However, since the FIFO-output signal itself has already been synchronized with the clock signal CLK on the LSI side, the F/F gate 12 may be omitted if there is a margin for a delay time from the F/F gate group 9, which receives the read address signal, to the internal logic through the 4-to-1 selector 10. Although the above embodiment has been described with reference to a memory interface control circuit for DDR2-SDRAMs, the present invention may be used for DDR-SDRAMs.

As has been described above, the above embodiment provides the following advantages. A first advantage is that the gridge noise tolerance of read data can be improved by masking the internal data strobe signal DQS2 at any time unless this signal is necessary.

A second advantage is that the mask timing of the internal data strobe signal is created from the data strobe signal DQS which has a constant relationship in timing with respect to the read data DQ from RAMs. Therefore, the mask timing can be set to an optimum value. As a result, limitations to physical locations can be alleviated between the memories and the LSI which performs the data transfer.

A third advantage is that the change timing of the internal data strobe signal DQS2 can be adjusted by a variable delay circuit. Therefore, the timing can be adjusted in a optimum condition.

Thus, the present invention has been described on the basis of a preferred embodiment thereof However, the memory interface control circuit according to the present invention is not limited to the embodiment described above. The scope of the present invention includes such configurations that would be derived from various corrections and modifications to the configuration of the embodiment.

What is claimed is:

1. A memory interface control circuit for use in a memory controller for reading data from a double-data-rate synchronous DRAM (SDRAM), comprising:
   a basic-mask-release-signal generation circuit for generating a basic mask-release signal based on a data strobe signal generated in the SDRAM and a read mode signal indicating a read mode of the SDRAM;
   a delay circuit for delaying the data strobe signal to generate a delayed data strobe signal;
   an internal data-strobe-signal generation circuit for generating an internal data strobe signal based on the delayed data strobe signal and the basic mask-release signal; and
   a latch circuit for latching read data based on the internal data strobe signal.

2. The double-data-rate SDRAM according to claim 1, wherein said delay circuit delays the data strobe signal with a variable delay.

3. The double-data-rate SDRAM according to claim 1, wherein said internal data-strobe-signal generation circuit includes a mask-release-signal generation circuit for generating a mask-release signal based on the basic mask-release signal and the read mode signal, and an AND gate for generating a logic product of the delayed data strobe signal and the mask-release signal.

4. The double-data-rate SDRAM according to claim 1, wherein said latch circuit is a first-in first-out (FIFO) circuit.

* * * * *